United States Patent [19]

Eberle

[11] 4,225,037
[45] Sep. 30, 1980

[54] ACID-PROOF CONVEYOR

[75] Inventor: William J. Eberle, Reading, Pa.

[73] Assignee: General Battery Corporation, Reading, Pa.

[21] Appl. No.: 894,349

[22] Filed: Apr. 7, 1978

Related U.S. Application Data

[60] Continuation-in-part of Ser. No. 866,515, Jan. 3, 1978, and a continuation of Ser. No. 770,889, Feb. 22, 1977, Pat. No. 4,109,793, which is a continuation of Ser. No. 600,840, Jul. 31, 1975, Pat. No. 4,027,797, which is a division of Ser. No. 475,273, May 31, 1974, Pat. No. 3,938,368, said Ser. No. 866,515, is a division of Ser. No. 669,216, Mar. 22, 1976, Pat. No. 4,081,093.

[51] Int. Cl.³ .................. B65G 21/20; B65G 47/00
[52] U.S. Cl. .................................. 198/861; 198/345; 198/791
[58] Field of Search ............... 198/339, 340, 345, 791, 198/857, 860, 861, 789, 781, 572, 341; 141/88, 129, 78, 97; 214/300, 301, 302, 312, 313, 314; 134/104, 201; 193/35 A

[56] References Cited

U.S. PATENT DOCUMENTS

| 2,524,182 | 10/1950 | Teigen | 198/339 X |
|---|---|---|---|
| 2,528,266 | 10/1950 | Daily et al. | 198/861 X |
| 2,712,377 | 7/1955 | Eggleston | 198/789 |
| 2,988,239 | 6/1961 | Miller et al. | 414/419 |
| 3,107,019 | 10/1963 | Malzahn et al. | 198/572 X |
| 3,167,196 | 1/1965 | Eberle | 414/414 |
| 3,332,533 | 7/1967 | Del Rossi | 198/483 |
| 3,486,744 | 12/1969 | Beyers et al. | 134/104 X |
| 3,970,180 | 7/1976 | Schlottmann et al. | 193/35 A |

FOREIGN PATENT DOCUMENTS 586343  3/1947  United Kingdom .................. 198/339

Primary Examiner—James L. Rowland
Attorney, Agent, or Firm—Benasutti Associates, Ltd.

[57] ABSTRACT

A novel conveying apparatus particularly adapted for use with electric storage batteries of the automotive type which is designed to reliably receive, convey, station and discharge batteries, to be impervious to acid, such as sulfuric acid, which may be discharged in the vicinity of those batteries, and to collect acid which spills in the vicinity of those batteries.

5 Claims, 3 Drawing Figures

ACID-PROOF CONVEYOR

CROSS REFERENCE TO RELATED APPLICATIONS

The present application is a continuation-in-part of my prior co-pending patent application Ser. No. 866,515, filed Jan. 3, 1978 entitled, "APPARATUS FOR DUMPING AND COLLECTING CORROSIVE SUBSTANCES FOR AUTOMATIVE BATTERIES", which in turn is a divisional of Ser. No. 669,216, filed Mar. 22, 1976 entitled, "APPARATUS FOR DUMPING AND COLLECTING CORROSIVE SUBSTANCES FROM AUTOMOTIVE BATTERIES", now U.S. Pat. No. 4,081,093, dated Mar. 28, 1978, each of which applications are hereby incorporated herein by reference.

The present application is also a continuation-in-part of my prior U.S. patent application Ser. No. 770,889, filed Feb. 22, 1977 now U.S. Pat. No. 4,109,793 entitled, "Automatic Air Leak Testing Apparatus and Method", which application is a continuation of application Ser. No. 600,840, filed July 31, 1975, now U.S. Pat. No. 4,027,797, dated June 7, 1977 entitled, "Automatic Air Leak Testing Apparatus And Method", which application is a division of application Ser. No. 475,273, filed May 31, 1974 now U.S. Pat. No. 3,938,368, dated Feb. 17, 1976 entitled, "Automatic Air Leak Testing Apparatus", which applications are incorporated by reference as if fully set forth herein.

BACKGROUND OF THE INVENTION

The present invention related generally to the field of conveying apparatus, and more particularly to the field of conveying apparatus which is adapted to handle electric storage batteries, particularly electric storage batteries of the automotive type. These batteries are characterized by their small size and extreme weight-to-volume ratios which result from their compact design and the substantial amounts of lead and liquids which may be contained therein. More particularly, the present invention relates to the field of conveying apparatus for use with such storage batteries during those phases of the manufacturing process of such batteries wherein the associated conveying apparatus is likely to be exposed to substantial amounts of acid, as for example, acid filling and/or acid dumping operations which may be conducted during the manufacture of those batteries.

It has long been a problem in the battery industry to provide safe and efficient mechanisms for filling and dumping corrosive substances from batteries during the manufacture thereof. Conventional roller-ways have sometimes been employed for use with acid filling apparatuses, however, inevitably certain amounts of acid spill from the apparatus over the batteries to be processed and on to the conveying apparatus and the floor therebelow. Constant contact of such acid with the components of the conveying apparatus may cause rapid corrosion thereof and failure of the various parts associated therewith, particularly those parts which are associated with the conveyor drive mechanism and the parts sensing systems, such as switches, etc., which enable such apparatuses to be fully automated. Heretofore, attempts to limit the adverse affects of such acid in the vicinity of conveyors associated with acid filling apparatuses have been limited to the provision of acid proof rollers and shafts which are utilized in that portion of the apparatus most likely to be contacted by acid. In acid dumping apparatuses, such as the acid dumping apparatus disclosed in my prior issued U.S. Pat. No. 3,167,196, dated Jan. 26, 1965, a battery aqualazing apparatus is disclosed for emptying batteries which includes a rotatable support means, conveyor means for moving the batteries into and out of the emptying assembly, which is connected to and supported by the rotatable support means, an elongate, inflatable battery gripping member positioned along each edge of the conveyor means and carried by the rotable support, and a trough located thereunder for receiving the substances dumped from the batteries during the dumping operation.

SUMMARY OF THE INVENTION

The present invention provides a novel acid-proof conveying apparatus for conveying electric storage batteries, particularly automotive electric storage batteries, into battery processing positions along the conveyor, and for thereafter conveying those electric storage batteries out of the processing position further along said said conveyor. The preferred embodiment conveyor apparatus of the present invention comprises an acid-proof trough having a plurality of rollers disposed substantially adjacent to the top surface thereof but within said trough. The shafts of each of the rollers to be powered extends through acid-proof bearings located in one of the walls of the troughs into a power transmission channel which is sealed with respect to the remaining portion of the apparatus and is preferably pumped with grease. Within the power transmission channel are located a plurality of gears, one for each of the rollers to be driven, each of which gears are engaged on opposite sides thereof by a single chain which is maintained in contact with these portions of the gears by reversible and replaceable TEFLON ® plastic wear strips disposed along the axes of the chain. For convenience in mounting, a conveyor drive motor is preferably attached to the shaft of one of the rollers which is elongated to extend through the other side of the trough to thereby power the entire roller conveyor. (As used throughout, the word "gears" refers to sprockets which are designed for use with conventional chain.)

In the preferred embodiment of the present invention, certain of the rollers are adapted to sense the presence and/or transmission of batteries thereacross and to activate appropriate sensing mechanisms so that associated machinery may be controlled in response thereto. These modified rollers have shafts which extend through the aformentioned power transmission channel to engage sensing means mounted on the exterior of that channel. Within the power transmission channel, biasing means such as springs are provided, which intend to limit the rotation of their associated rollers. This biasing means in combination with the aforementioned sensing means causes the roller to return to a preselected normal position while allowing that roller to pivot through a predetermined arc of rotation upon movement of a battery thereacross to thereby activate the sensing means. In the preferred embodiment, an acid-proof projection is provided projecting generally upwardly from the roller in its normal position to insure that a battery passing thereacross will activate the aforementioned sensing means.

In the preferred embodiment a novel, acid-proof means for retaining the batteries in the battery processing position is also provided. This means includes a platform having a transverse surface associated therewith having mounted therealong an inflatable gripping member which, upon the presence of one or more batteries in the desired battery processing position may be inflated to align and hold those batteries in that position.

As described above, the preferred embodiment conveyor of the present invention is entirely acid-proof in the vicinity of the battery processing position and is adapted to efficiently process batteries through that position while facilitating the collection of corrosive substances which may be spilled over those batteries while in that position.

Accordingly, a primary object of the present invention is the provision of an acid-proof conveying apparatus for use in processing automotive lead-acid storage batteries.

A further object of the present invention is the provision of a power driven conveying apparatus for use with corrosive substances which incorporates an improved drive train assembly.

A further object of the present invention is the provision of a conveying apparatus for use with corrosive substances which incorporates a novel means for sensing the presence of objects which are present at one or more points located therealong.

These and other objects of the present invention will become apparent from the following more detailed description.

DETAILED DESCRIPTION OF THE DRAWINGS

Figure 1:
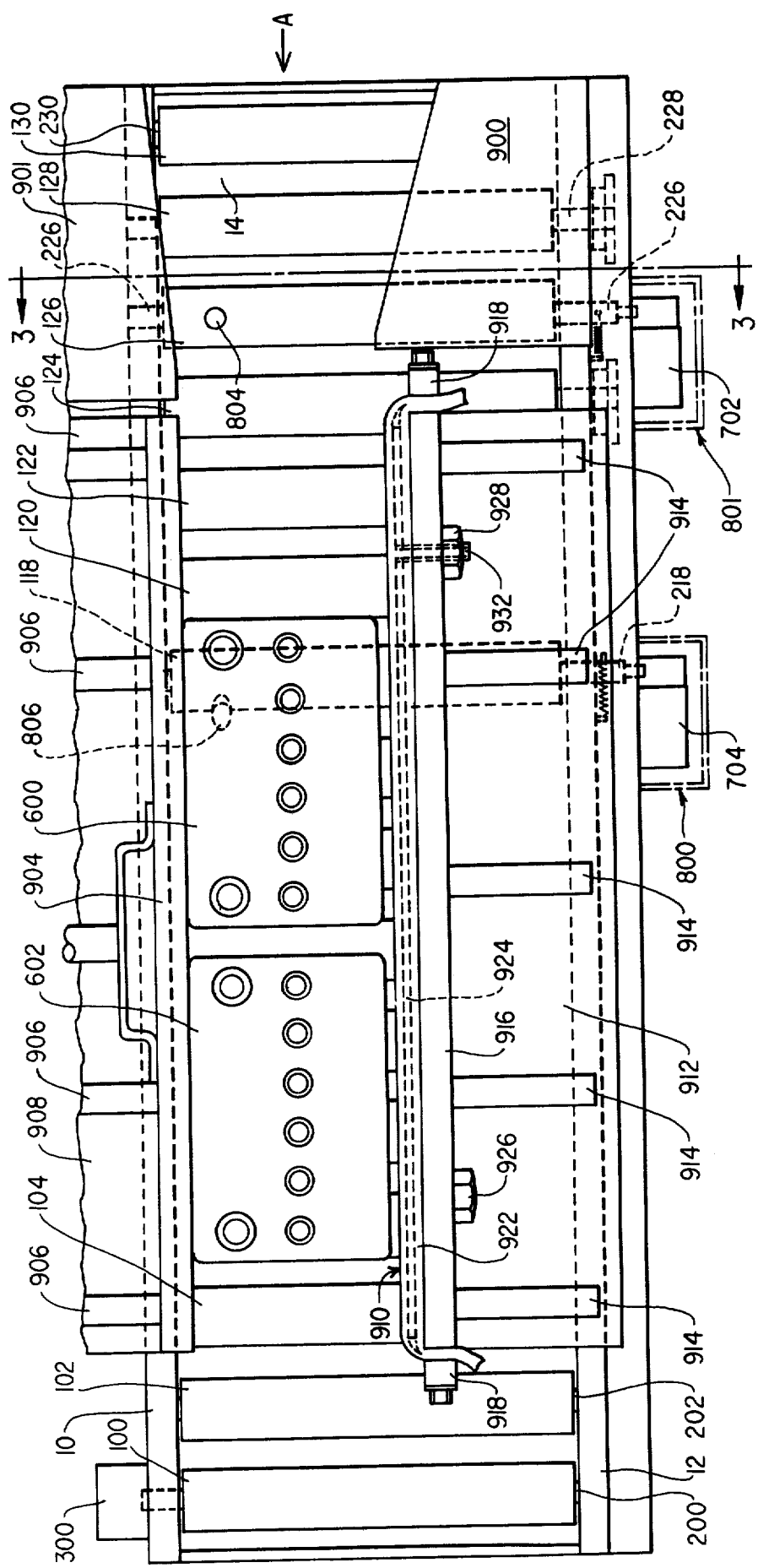
FIG. 1 is a top view of the preferred embodiment acid-proof conveying apparatus of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to the figures, the preferred embodiment acid-proof conveying apparatus of the present invention is seen to comprise an acid-proof trough means for collecting corrosive substances spilled over the batteries to be processed. This trough means is comprised of sides 10 and 12 which are substantially parallel solid wall members which are sealed with respect to inclined bottom 14, which is fitted at its lower end thereof with a discharge fitting, designated generally 16 for facilitating the discharge of collected materials from within the trough during the operation of the apparatus. The ends of the trough are sealed against leakage of acid by end plates 984 and 985.

Figure 2:
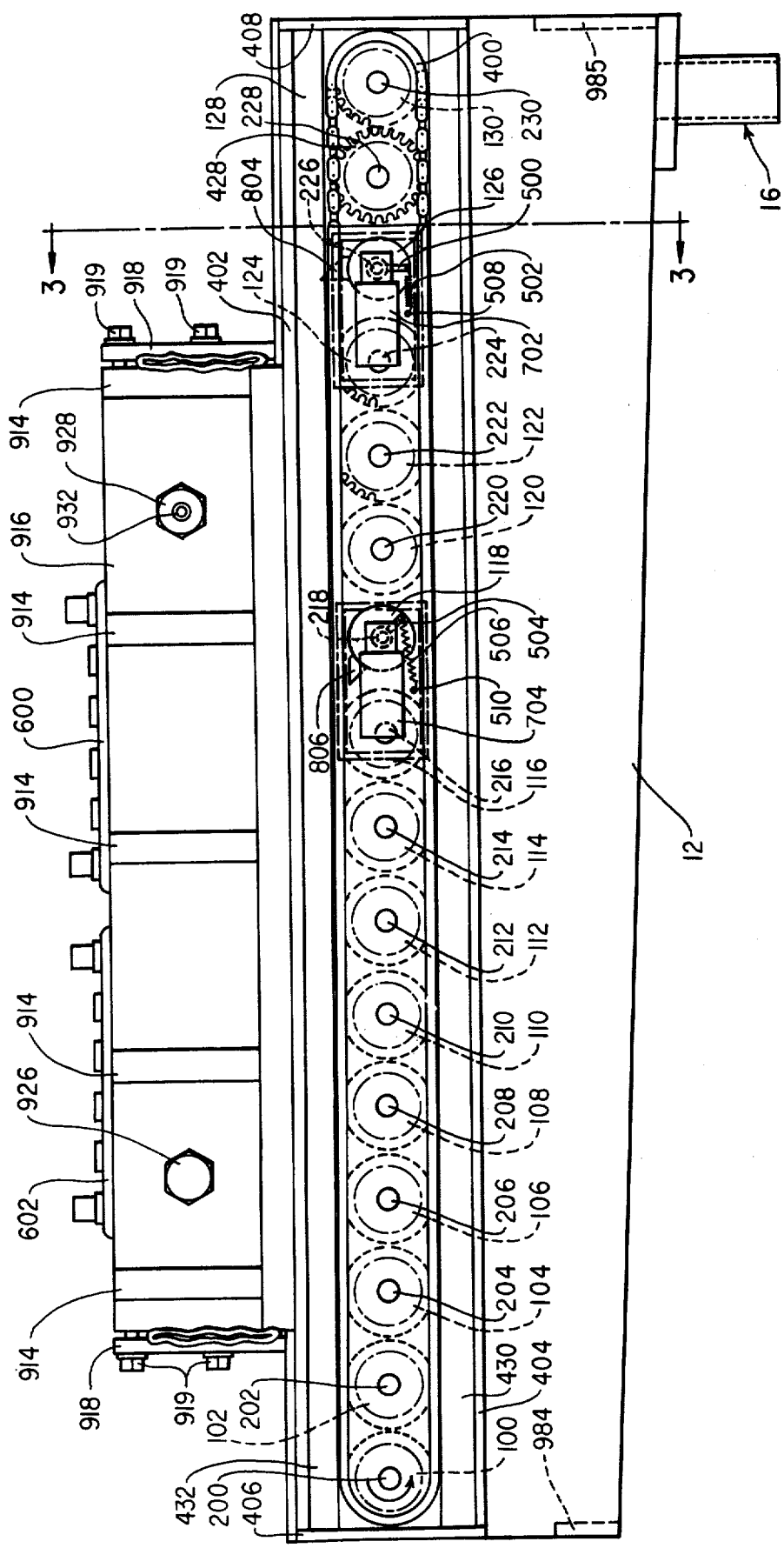
FIG. 2 is a side view of the preferred embodiment acid-proof conveying apparatus of the present invention.

The acid-proof conveying apparatus further comprises a plurality of acid-proof rollers 100, 102, 104, 106, 108, 110, 112, 114, 116, 118, 120, 122, 124, 126, 128, and 130. In the preferred embodiment, these rolles are PVC schedule 80 rollers, which are mounted on stainless steel shafts 200, 202, 204, 206, 208, 210, 212, 214, 216, 218, 220, 222, 224, 226, 228, and 230, each of which shafts is associated with its similarly numbered roller in the 100 series, as described aforesaid. As shown in particular in FIGS. 2 and 3, these shafts and the rollers associated therewith are disposed within the trough some distance below the top surface of the trough in a plane substantially parallel to that top surface and perpendicular to the sides. The stainless steel shafts extend through and are supported by and acid-sealed with respect to the sides 10 and 12 which are fitted with acid-proof bearings, such as silicone filled TELFON ® bearings, which are referred to by the art as "RULON"bearings. As seen in particular in FIG. 3, the disposition of this roller-way within the acid-sealed trough of the present invention, and the use of acid-proof components such as "UHMW" acid-proof plastic material for the construction of the sides 10 and 12 and the bottom 14, create a working conveyor surface which is substantially impervious to contact with acid, and is adapted to efficiently collect that acid if such material is spilled during the operation of the device. In the preferred embodiment, the entire conveying apparatus is powered through a single motor 300 which is mounted on side wall 10 and which engages stainless steel shaft 200 which is somewhat elongated with respect to the shafts of its adjacent rollers to extend through an acid-proof, sealed bearing in wall 10 to facilitate this connection. This motor may be an electric motor, but is preferably an air motor or hydraulic motor with sufficient torque to easily drive the apparatus under load. In the embodiment shown in the figures, each of the rollers except rollers 118 and 126 are to be powered rollers, and accordingly, except for these rollers, each of the shafts of the remaining rollers are extended through side wall 12 into a sealed power transmission channel wherein they are fitted with gears which are driven by chain 400. As seen in the figures, the power transmission channel is defined adjacent to an exterior surface portion of side wall 12 in the vicinity of the roller conveyor by power transmission channel top plate 402, power transmission channel bottom plate 404, power transmission channel end plates 406 and 408 and power transmission channel cover plate 410. These materials may be constructed of steel, however, in the preferred embodiment at least the power transmission cover plate 410 is made, as shown, of a transparent plastic material such as "lexan" plastic sheet, which will facilitate the visual inspection of the power train during the operation of the device. In FIG. 2, the gear chain detail is shown only in the vicinity of gear 428 which is fitted on shaft 228 and is shown being engaged on opposite sides by chain 400, the individual links of which are shown only in this vicinity. The other gears associated with the power driven rollers are shown in phantom in the remaining portion of FIG. 2, as is the chain 400. The power transmission channel of the present invention additionally comprises two replaceable wear strips 430 and 432 which are disposed along the length of chain 400 to maintain the chain against both the upper and lower portions of each of the gears along the entire length of the gear train. In the preferred embodiment, these wear strips are a solid lubricant material such as TEFLON ® plastic. Accordingly, upon rotation of shaft 200 by motor 300, the chain will, in turn, be driven along both sides of the gears, the engagement of the chain along which gears will be constantly maintained along substantially the entire length of said chain by the aforementioned wear strips 430 and 432. By driving the gears of this gear train on opposing sides, bearing wear may be substantially reduced. This is particularly important since mechanically fragile acid-proof bearings are preferably utilized, the acid-sealed integrity of which must be maintained in order to preserve the integrity of the drive mechanism and drive chain. It is anticipated that during the operation of the device over a substantial period of time, slight grooves will be worn in wear strips 430 and 432 by the chain passing thereacross. This wear is minimized by filling the entire power transmission channel with grease to lubricate the contents thereof. Nonetheless, as the wear strips begin to show signs of wear, it is possible to simply remove one of the end plates 406 or 408 and to slide the wear strips longitudinally out of the power transmission channel, whereupon they may be inverted and/or reversed in position to present new unworn sufaces to contact the longitudinal chain surfaces to thereby insure positive contact between the chain and the appropriate portions of each of the gears.

In the preferred embodiment of the present invention, certain of the rollers are adapted to sense the presence and/or transmission of batteries thereacross and to activate appropriate sensing mechanisms so that associated machinery may be controlled in response thereto. In the embodiment shown in the figures, these modified rollers are rollers 126 and 118. As with the powered rollers, these rollers 126 and 118 are pinned to their associated shafts 226 and 218, respectively, utilizing PVC pins at either end. Unlike the powered rollers, these rollers are not fitted with gears within the power transmission channel, but rather each are provided within that channel with biasing means comprising pins 500 and 504 which extend generally perpendicularly away from the axis of shafts 226 and 218, respectively, so that rotation of the rollers will produce a pivoting of biasing pins 500 and 504 around these shafts. Near the remote termini of these shafts 226 and 218, biasing springs for biasing these rollers into preselected normal positions are provided which, as shown in the drawings, are springs 502 and 506 which are anchored at their remote ends to side wall 12 by attachment means 508 and 510. As shown in FIG. 2, roller 126 is in its normal position whereas roller 118 is in its activated position by reason of the presence of a battery 600 which is disposed thereover. In either position, the biasing pins do not interfere with the operation of the powered rollers since their length is less than the inner radius of the drive gears, while the biasing springs are located between and somewhat offset from the chain. Acid seals are maintained between shafts 226 and 218 and wall 12 by acid-proof bearings, thus disposing the biasing means in the entirely sealed power transmission channel.

Figure 3:
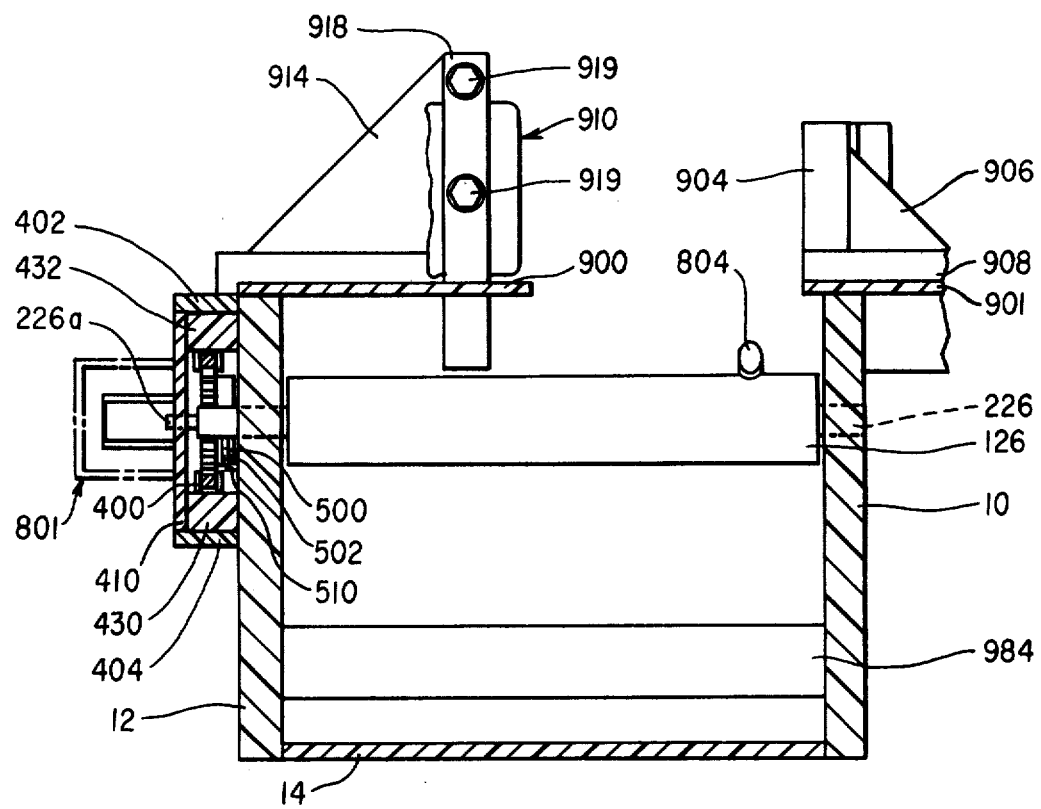
FIG. 3 is a cross-section on an enlarged scale of the acid-proof conveying apparatus illustrated in FIGS. 1 and 2, taken as indicated by the lines and arrows 3—3 in FIGS. 1 and 2, the batteries shown in FIGS. 1 and 2 being omitted from this view.

As seen particularly in FIG. 3, shafts 226 and 218 are "stepped-down" to a smaller diameter before passing through bearings located in power transmission channel cover plate 410. Each of these shafts 226 and 218 engage switches 702 and 704, respectively. These switches receive these "stepped-down" portions such, as "stepped-down" portion 226a shown in FIG. 3, and are adapted to make or break a switching contact in response to a preselected arc of shaft rotation. These switches are also adapted to prevent the rotation of the rollers in the clockwise direction past the normal position as shown for roller 126 in FIG. 2. These switches may preferably be pneumatic switches, or alternatively electric switches or other sensing devices. Their mounting along the exterior surface of the power transmission channel facilitates their use in zones which are remote from those areas of the apparatus which are likely to be contacted with corrosive materials. Further, by disposing these switches on the remote side of a power transmission channel which is filled with grease, an effective acid barrier is created between the rollers and the switches, which barrier protects these switches, which are otherwise prone to destruction by acid.

In order to protect the exterior surface of these switches, switching housings, designated generally 800 and 801 (shown in phantom in the figures), are provided which are rectangular acid-proof boxes mounted around the switches on the exterior surface of the power transmission channel against power transmission channel cover plate 410. In order to insure that batteries passing over rollers 126 and 118 will, in fact, trigger the switches, even for example, when the surfaces of those rollers are slippery by reason of their coating with acid or other corrosive substances, roller triggers 804 and 806 are provided within the path of battery advancement on each of rollers 126 and 118. These roller triggers 804 and 806 are cylindrical projections of PVC material which are fitted into bores created within those rollers, which, in the preferred embodiment, are bevelled on the sides which initially receive the batteries introduced thereacross. For example, when batteries are introduced in the direction of arrow A shown in FIG. 1 by powered rollers 128 and 130, the battery will act directly on trigger 804 to positively rotate roller 126 to create the desired contact within switch 702. As seen particularly in FIG. 2, triggers 804 and 806 are each bevelled such that upon rotation of their rollers into the activated position, the bevelled surface of the roller is substantially parallel with the top of the remaining rollers in the roller conveyor. In this position, batteries can easily slide over the trigger to advance along the conveyor. After the batteries are advanced past the trigger, the biasing means will return their associated rollers to their normal positions, as shown for example for roller 126, The preferred embodiment of the present invention also includes means for guiding batteries into a particular operating position on the conveying surface and for gripping those batteries in that position. Referring in particular to FIG. 1, guide plates 900 and 901 are disposed on relatively opposing sides of the conveyor to guide the batteries into the appropriate position relative to the axis of the conveyor. As a first battery is introduced on to the conveyor in the direction of arrow A shown in FIG. 1, it will trigger roller 804 and activate switch 702 and then trigger 806 to activate switch 704 to indicate that a battery is present on the conveyor section. An appropriate stop, not shown in the drawings, will activate to prevent the batteries from moving further along the conveyor than the position shown for battery 602 in FIG. 1. Upon introduction of a second battery onto the conveying apparatus, switch 704 will be maintained in a condition of activation as battery 600 comes to rest on top thereof. Switches 702 or 704, or combinations thereof, can not only be used to trigger the stop mechanisms associated with the conveyor, but also be used to trigger associated battery processing apparatus.

Once the batteries are introduced into the battery processing positions which are located generally in the areas in which batteries 600 and 602 are illustrated in the drawings, it may be desired to align those batteries axially with respect to the axis of the rollers to press those batteries against guide bar 904 which is reinforced by angle brackets 906, which in turn are mounted on mounting plate 908. This is preferably accomplished by providing an inflatable gripping member designated generally 910 which may be inflated to move the batteries against guide bar 904 and to hold the batteries in position during processing, as for example during acid filling. The inflatable gripping member designated generally 901 preferably comprises a length of mine discharge hose which is a composition of an elastic vinyl reinforced with acrylic fibers. This type of mine discharge hose is availabe from the B. F. Goodrich Company. In the preferred embodiment, the means for axially aligning the batteries in the battery processing position and for holding those batteries in that position comprises a gripping member mounting plate 912 having gripping angle brackets 914 and gripping member support member 916 mounted thereon, as shown in the drawings. Gripping member end plates 918 are bolted to either end of the gripping member support plate 916 by bolts 919 to seal either end of the hose section 922 of the inflatable gripping member, designated generally 910. Within the hose section 922 is disposed an internal gripping member plate 924 which may be made for example of steel and which is disposed within the hose section 922 to extend for substantially the entire length of that hose section across gripping member support plate 916. This internal gripping member plate 924 is bolted to the inflatable gripping member support plate 916 by means of bolts 926 and 928 which extend through one wall of the hose section 922 to grab the plate and compress to compress a wall of the hose section therebetween to insure that a seal is maintained which prevents air from escaping from the hose section 922 during inflation. As shown in FIG. 1, bolt(s) 928 may be bored to define input conduit 932 which acts as a passage for the introduction and exhaustion to and from the inflatable gripping member 910 to cause the hose section 922 to expand and press the batteries 600 and 602 against bar 904. As seen in FIG. 1, which shows the inflatable gripping member in its deflated condition, very little clearance is provided between the gripping member and the batteries which clearance is made possible through the evacuation of the inflatable gripping member when it is desired to allow the battery to pass freely therealong. From the above, it will be seen that an acid proof means is accordingly provided for selectively aligning and clamping the batteries into an aligned processing position. Since all of the material utilized are acid-proof, an extremely reliable mechanism for aligning and gripping batteries in the processing position is provided.

From the above description it will be seen that a novel conveying apparatus is provided for conveying batteries into battery processing positions and for resisting the effects which corrosive substances which are spilled in the vicinity of those batteries might otherwise have on the conveying apparatus. It may further be seen that a novel, extremely effective means for aligning and gripping the batteries in the battery processing position is provided, that a novel, efficient, and reliable drive mechanism is provided for conveying the batteries into and out of the battery processing position, and that a novel, reliable means for sensing the presence of batteries at one or more positions along the conveyors is provided, whereby an extremely reliable battery processing apparatus is achieved.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a non-legal, technical statement of the contents of the disclosure in compliance with the Rules of Practice of the United States Patent and Trademark Office, and is not intended to limit the scope of the invention described and claimed herein.

What is claimed is:

1. An acid-proof conveying apparatus for conveying electric storage batteries into and out of a battery processing position defined therealong, comprising:
   a. trough means for receiving corrosive substances which may spill into the vacinity of the battery processing position;
   b. roller means disposed within and supported by a trough means for conveying said batteries through at least a portion of said trough;
   c. means for sensing the presence of the battery at least one location along said conveyor, said means being comprised of:
      (i) at least one shaft supported by said trough extending through a wall of said trough,
      (ii) trigger means causing the rotation of said shaft upon the introduction of a battery into said location,
      (iii) switch means for engaging said shaft for responding to the rotation of said shaft to sense the presence of said battery, and
      (iv) biasing means for biasing said shaft towards a normal position; and
   d. an acid-sealed channel disposed adjacent to said trough, said biasing means being disposed within said channel.

2. The invention of claim 1 wherein switch means is disposed adjacent to said channel on a side of said channel remote from said trough.

3. The invention of claim 1 wherein said trigger means further comprises at least one roller attached to said shaft for engaging said battery upon the advancement of said battery into said location.

4. The invention of claim 1 wherein said trigger means further comprises at least one projection associated with said shaft for engaging said battery upon advancement of said battery into said location.

5. The invention of claim 4 wherein said projection comprises a bevelled cylinder, said bevel being disposed to slidingly engage said battery upon the advancement of said battery through said location.

* * * * *